(12) United States Patent
Roos et al.

(10) Patent No.: US 8,357,622 B2
(45) Date of Patent: Jan. 22, 2013

(54) PLASTIC GLIDE LAYER AND SLIDING ELEMENT WITH SUCH

(75) Inventors: Udo Roos, Homberg (DE); Kamran Laal Riahi, Marburg (DE); Armin Linker, Stadtallendorf (DE)

(73) Assignee: Federal-Mogul Deva GmbH, Stadtallendorf (DE)

(*) Notice: Subject to any disclaimer, the term of this patent is extended or adjusted under 35 U.S.C. 154(b) by 707 days.

(21) Appl. No.: 11/855,535

(22) Filed: Sep. 14, 2007

(65) Prior Publication Data
US 2008/0160853 A1 Jul. 3, 2008

(30) Foreign Application Priority Data
Sep. 14, 2006 (DE) .......................... 10 2006 043 065

(51) Int. Cl.
*B32B 27/04* (2006.01)
*B32B 27/12* (2006.01)
*B32B 27/20* (2006.01)
*B32B 27/14* (2006.01)
*D02G 3/02* (2006.01)

(52) U.S. Cl. .............. 442/148; 442/74; 442/75; 442/97; 57/295; 57/296; 57/297; 57/298

(58) Field of Classification Search ............ 57/295–298, 57/355; 428/359, 361, 364, 372; 442/70, 442/72, 74, 97, 148
See application file for complete search history.

(56) References Cited

U.S. PATENT DOCUMENTS

| | | | | |
|---|---|---|---|---|
| 3,776,409 A * | 12/1973 | Pearson | ..................... | 220/62.19 |
| 3,932,008 A * | 1/1976 | McCloskey et al. | .......... | 384/300 |
| 5,501,879 A * | 3/1996 | Murayama | ..................... | 427/381 |
| 6,132,866 A * | 10/2000 | Nelson et al. | .................. | 428/359 |
| 2003/0226347 A1* | 12/2003 | Smith et al. | ..................... | 57/210 |
| 2004/0213492 A1* | 10/2004 | Kim et al. | ..................... | 384/300 |

FOREIGN PATENT DOCUMENTS

| | | |
|---|---|---|
| DE | 84 00 958.6 | 2/1984 |
| DE | 3524761 A1 | 1/1987 |
| DE | 4220327 C1 | 6/1993 |
| DE | 295 12 317 U1 | 11/1995 |
| DE | 20 2005 005 829 U1 | 7/2005 |
| DE | 20 2004 013 251 U1 | 2/2006 |
| DE | 10 2004 041 084 A1 | 3/2006 |
| WO | WO 89/02542 | 3/1989 |

* cited by examiner

*Primary Examiner* — Jennifer A Steele
(74) *Attorney, Agent, or Firm* — Robert L. Stearns; Dickinson Wright, PLLC

(57) ABSTRACT

A sliding layer and a sliding element with such a sliding layer includes a fiber reinforced plastic with a plastic matrix and a plastic thread as a reinforcing element. The plastic thread has polyester filaments into which are worked PTFE particles by process engineering.

18 Claims, 4 Drawing Sheets

PLASTIC GLIDE LAYER AND SLIDING ELEMENT WITH SUCH

RELATED APPLICATIONS

This application claims priority to German Patent Application 10 2006 043 065.4-43, filed Sep. 14, 2006.

BACKGROUND OF THE INVENTION

1. Technical Field

The invention relates to a sliding bearing based on fiber-reinforced plastic with a plastic matrix and a plastic thread as reinforcing element. It also relates to a sliding element with such a sliding layer.

2. Related Art

The use of composite fiber materials for sliding bearings, in particular wound plastic sliding bearings based on epoxy resins, is of prior art. Such sliding bearings consist of a single-layer sliding layer material or a bearing material constructed from two layers, a support layer and a sliding layer. The sliding layer may be located on the inside relative to the support layer, according to the application. The support layer is typically characterised by a glass fiber or carbon fiber reinforced epoxy resin matrix which has a very high load absorption capacity. The sliding layer consists in most cases of special plastic fibers or threads of varying abrasiveness as reinforcing elements, solid lubricants and also of an epoxy resin matrix. The composition is set so that the required tribological properties are also set, which vary according to the material and condition of the counter-rotating element and the ambient conditions (wet or dry running).

The use of PTFE (polytetrafluoroethylene) or graphite, among other things, as a solid lubricant for the self-lubricating sliding layer, is of prior art. These substances are either added to the plastic matrix in particle form or, in the case of PTFE, are intertwined in the form of a filament with other plastic filaments to form the plastic thread of the sliding layer. As is well known, polyester is generally used as the thread plastic in most cases. Typically two polyester and one PTFE filament are intertwined to form a thread.

Both the sliding layer and the support layer of the sliding element are produced by winding the synthetic resin impregnated plastic thread or the synthetic resin impregnated glass fiber onto a rotating mandrel (winding core). The pipes with a circular cross-section thus produced are further processed into cylindrical bushes, semicircular bearing bushes and the like.

Although the use of PTFE as a solid lubricant has proved satisfactory in fiber reinforced plastic sliding layers due to its good sliding friction properties, tribological and mechanical properties not yet satisfactory for all applications have been achieved. For PTFE is highly reaction inert, because of the strong intermolecular binding of the carbon and fluorine atoms, and has a very low surface tension. Therefore no chemical reaction, or no appreciable reaction, takes place between the plastic matrix and the PTFE. It was established, particularly when the prior art plastic threads of two polyester filaments and one PTFE filament were used, that the PTFE filaments only reached a very adhesion to the plastic matrix. Consequently the sliding layers of prior art could not be re-machined mechanically without difficulty, or not at all. In most cases the result was delamination of the sliding layer and deterioration in the tribological properties and in the wear resistance of the siding layer.

SUMMARY OF THE INVENTION

The object of this invention is therefore to provide a sliding layer or sliding element which such a sliding layer based on a fiber reinforced plastic, which is easy to produce, can easily be re-machined and has a high wear resistance with good sliding properties.

The sliding layer based on a fiber reinforced plastic has, according to the invention, a plastic thread as a reinforcing element which contains polyester filaments into which PTFE particles are worked in, in particular spun in.

This has the advantage over the twisted fibers of prior art of greater variability in the content of the individual components of the thread/fiber, particularly its PTFE content. Therefore its properties can be modified much more precisely even during the production of the plastic thread. Due to the fact that the PTFE particles do not adhere together, unlike the PTFE filament, i.e. due to the PTFE particles arranged and anchored randomly inside the polyester filaments, the plastic thread has a roughed up appearance and a better adhesive bond is achieved between the plastic thread and the plastic matrix. Finally, the binding of the PTFE particles in the plastic thread reinforces the mechanical retention of the same, due mainly to positive mechanical engagement.

The sliding layer may therefore be satisfactorily machined mechanically, i.e. with cutting. The use of the plastic thread with PTFE particles in the sliding layer is therefore particularly suitable for precision sliding bearings which have, for example, to be re-machined by drilling, honing or the like to a final dimension. The sliding layer according to the invention or the sliding element according to the invention also opens up other areas of application because lubrication or dirt grooves, for example, can be worked into the sliding layer, with the aid of which particles or lubricants can be specifically removed or supplied. In addition to the improved machinability, improved wear values, particularly in terms of depth wear, are also achieved because of the improved binding of the PTFE particles.

The sliding layer according to the invention also has advantages over the prior art sliding layers with PTFE particles as a solid lubricant in the plastic matrix. For as a solid lubricant in the plastic matrix PTFE also has a strength reducing action, thus impairing the tribological properties at high load and in an aqueous environment, and while the PTFE particles in the plastic matrix are in most cases distributed inhomogeneously because of the different material thickness, the distribution of the particles throughout the sliding surface is highly homogeneous since the particles are solidly bound in the fiber/thread which extends throughout the thickness of the sliding layer. Due to the improved homogeneity and improved mechanical binding, improved tribological properties are also ultimately achieved. This applies to both dry running and its use in an aqueous environment.

It is advantageous for the proportion of the PTFE particles by weight in the plastic thread to be between 2% and 40% by weight, and the proportion of the polyester filaments by weight in the plastic thread to be between 60 and 98% by weight. In particular preference the proportion of the PTFE particles by weight in the plastic thread is between 30 and 36% by weight, while the proportion of the polyester filaments by weight in the plastic thread is between 64 and 70% by weight.

In this weight ratio the adhesion between the plastic thread and the plastic matrix remains sufficiently high to achieve good machinability. On the other had the proportion of the PTFE particles is sufficiently high to achieve a good sliding characteristic.

In an advantageous embodiment of the sliding layer, the reinforcing element has the structure of a fabric or knitted fabric produced from the plastic thread.

According to another preferred embodiment the reinforcing element has a wound structure which has been produced by winding the plastic thread onto a winding core.

In this case particular attention is paid to the advantages of the plastic thread used according to the invention. For because of its roughness, it is eminently suitable for producing sliding layers in the winding process, where the thread is first guided through an impregnating tank filled with synthetic resin, and in doing so is sufficiently impregnated by the synthetic resin. The winding process offers the advantage that a certain winding structure can therefore be produced to match the intended application of the sliding element or the sliding layer. For instance the fibers may be positioned in the fiber composite so that it withstands the stresses as far as possible, i.e. according to the force and tension distribution.

The plastic matrix preferably consists of a synthetic resin, and in particular preference, of epoxy resin.

In addition to the PTFE particles spun into the plastic thread, PTFE particles are preferably also added to the plastic matrix in many applications. The proportion of PTFE particles in the plastic matrix is in this case a maximum of 40% by weight. In an alternative embodiment the plastic matrix may contain graphite particles. The proportion by weight of the graphite particles in the plastic matrix is preferably between 1 and 40% by weight.

Furthermore, both PTFE particles and graphite particles may be added to the plastic matrix whose total proportion by weight is preferably no more than 40%.

The sliding element according to the invention has a sliding layer as described above. the sliding element also preferably has a support layer consisting of forced plastic.

In the case of thin-walled sliding bearings, however, it is also possible to consist only of one (single layer) sliding layer. Although the mechanical loading capacity decreases, this design may be preferable in cases of low loading for reasons of cost and space.

The fiber reinforced plastic of the support layer consists in an advantageous embodiment of a plastic matrix with a glass fiber as reinforcing element, the plastic matrix preferably consisting of a synthetic resin, and in particular preference of epoxy resin.

Just as for the plastic matrix of the sliding layer, epoxy resin is also suitable as a plastic matrix for the support layer due to excellent adhesion properties, mechanical and dynamic properties. Because of its molecular structure epoxy resin also has very good moisture resistance and comparatively little tendency to swell. Because the same plastic matrix is used in the sliding and support layer, the binding forces between the sliding layer and the support layer are also increased.

The reinforcing element of the support layer also preferably has the structure of a fabric or knitted fabric produced from the glass fiber, the fabric being wound around a winding core, or in another preferred embodiment has a winding structure which is produced by winding the glass fiber or a glass fiber bundle onto a winding mandrel.

If the sliding layer and support layer are deposited in succession on a winding mandrel in the winding process, this increases the efficiency of the production of the compound bearing material.

THE DRAWINGS

Further objects, features and advantages of the invention are explained in the following with reference to exemplary embodiments with the aid of the drawings.

Figure 3A:
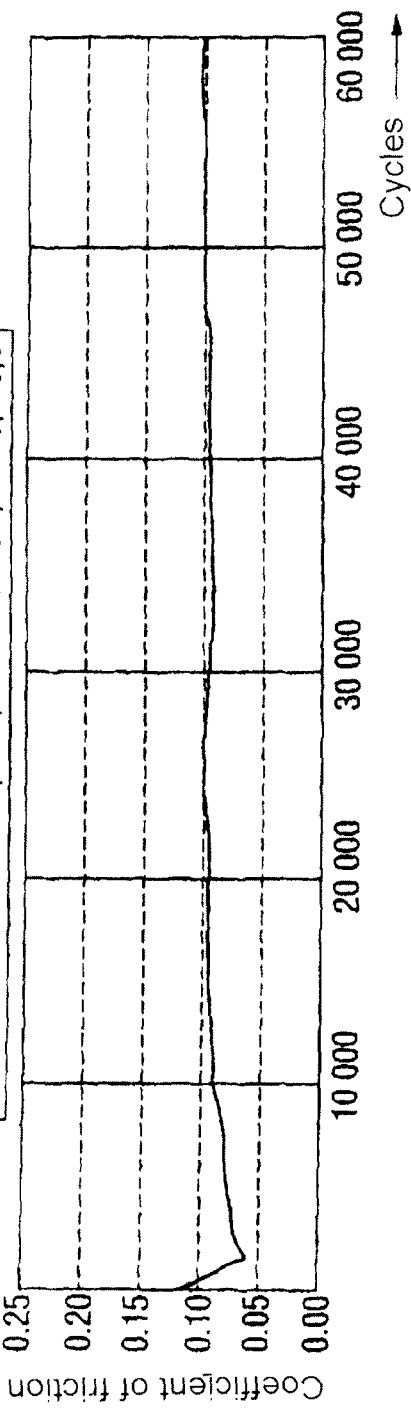
Figure 4A:
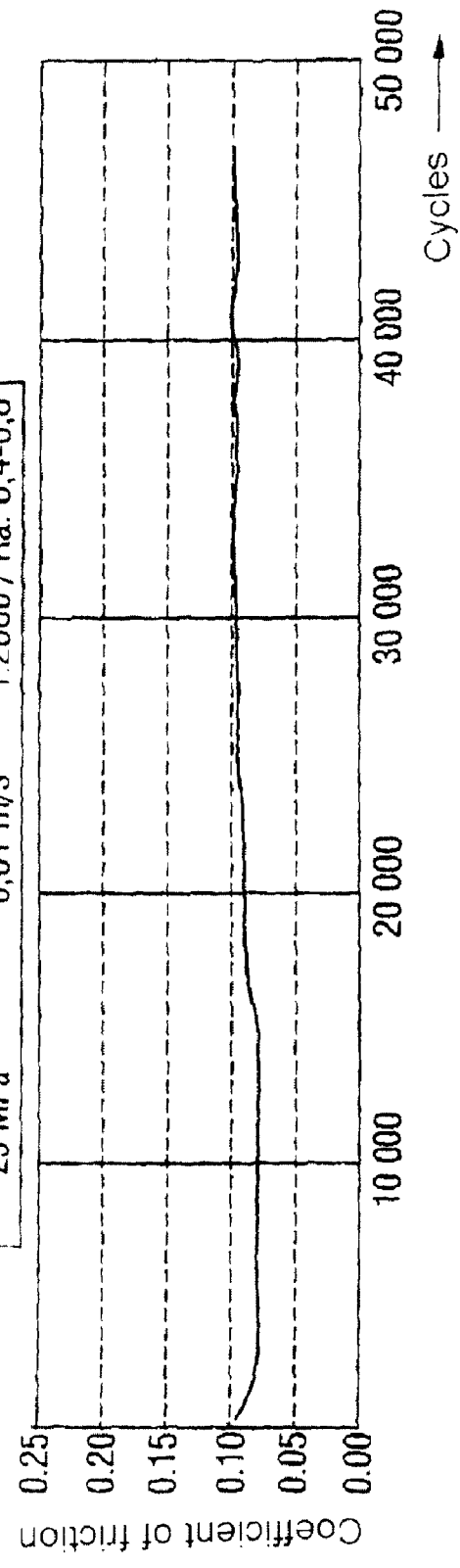

FIGS. 3a, b show two graphs of the coefficient of friction of a radial sliding bearing according to the invention under different loads in dry running and FIGS. 4a, b show two graphs of the coefficient of friction of a radial sliding bearing according to the invention under different loads in wet running.

DETAILED DESCRIPTION

Figure 1:
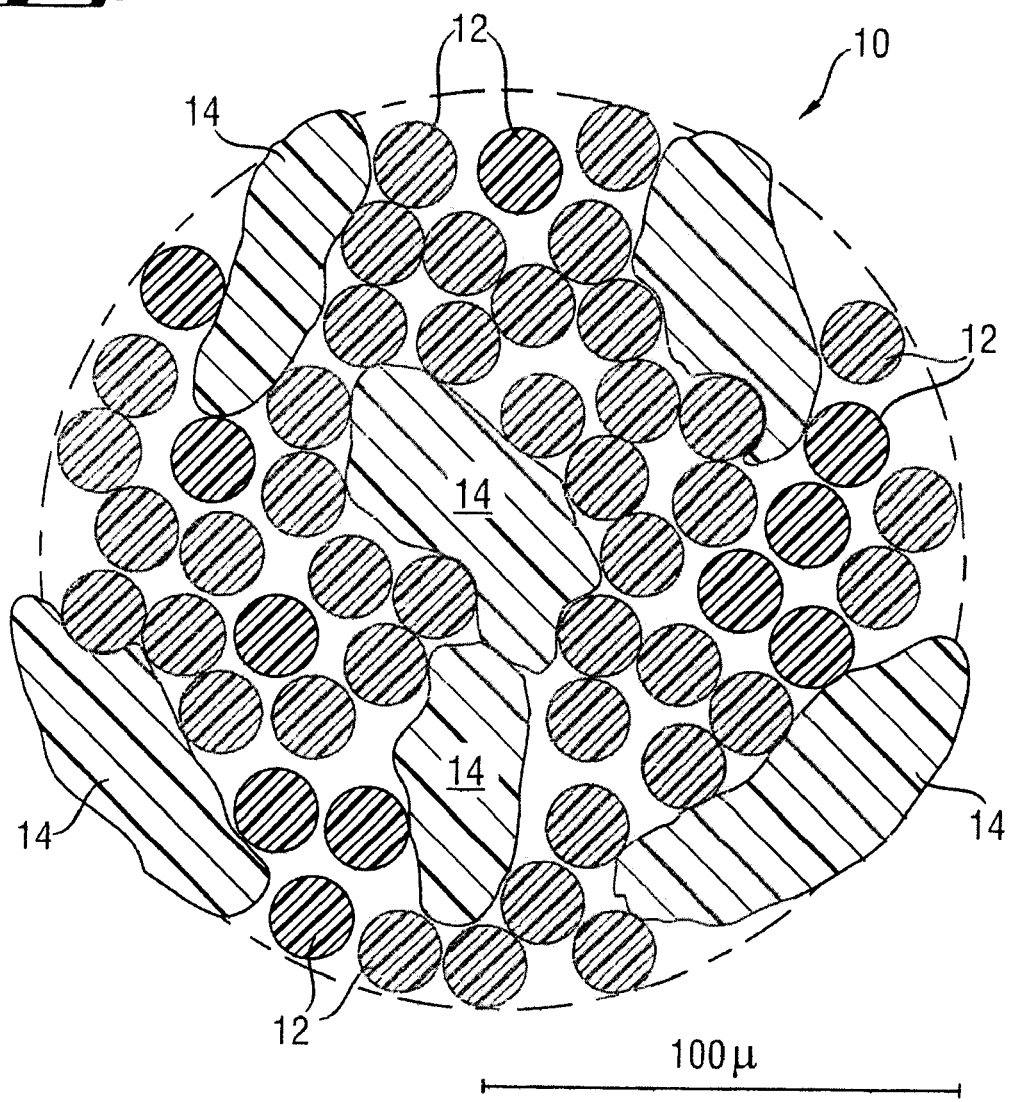
FIG. 1 shows a cross-section through the plastic thread used in the sliding layer according to the invention.

Plastic thread 10 used according to the invention for the sliding layer of the outer race as a reinforcing element is shown in FIG. 1 in an enlarged sectional representation. This consists of polyester filaments 12 orientated along the thread and contains as a second component PTFE particles 14 which are spun into polyester filaments 12 in a random arrangement. During the production process there are very many possibilities of modifying the properties of the thread. For example, the number of polyester filaments 12 per thread 10 can be varied according to the application, but here attention should be paid to ensuring an adequate positive engagement with the bound in PTFE particles 14.

The weight ratio of polyester filaments 12 to PTFE particles 14 may also be varied. However, it has proved particularly preferable, in terms of adhesion, friction and sliding characteristic, if the proportion of the PTFE particles 14 in the plastic thread is between 30 and 36% by weight and the proportion of polyester filaments 12 by weight is between 64 and 70% by weight.

The titre of plastic thread 10 according to FIG. 1 has a preferred value of between 100 dtex and 600 dtex, and in particular between 400 dtex and 550 dtex (1 dtex=1 g/1000 m of yarn).

Because of these parameters a sufficiently solid binding of PTFE particles 14 into polyester filaments 12 is achieved, which provide adequate support in terms of wear resistance and mechanical machining. The sliding layer therefore retains is good tribological properties even when it is re-machined, for example, by cutting grooves or drilling.

PTFE particles 14 are also distributed homogeneously over the thread length and hence throughout the woven, knitted or wound structure of the reinforcing element. Thread 10 can be excellently wetted and hence well processed because of the partially loose composite that forms a multiplicity of ducts. The cross linkage of the matrix penetrating the depth of the ducts guarantees improved adhesion.

Figure 3B:
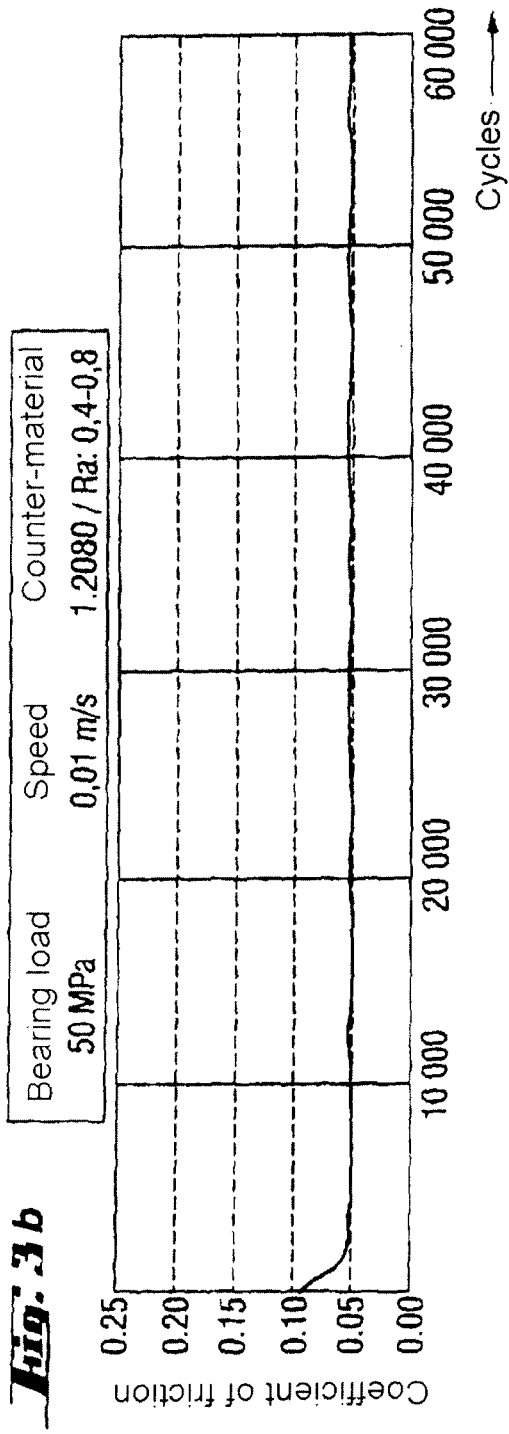

Plastic thread 10 generally appears roughened or fibrous, as does the finished siding layer. This optical roughness is due to the randomly orientated PTFE particles 14 and is not associated with an increased coefficient of friction due to their sliding characteristic. The sliding characteristic of the sliding layer according to the invention is generally of the same good quality in different applications even over a long period of stress, as will become clear with reference to the graphs in FIGS. 3 and 4.

Figure 2:
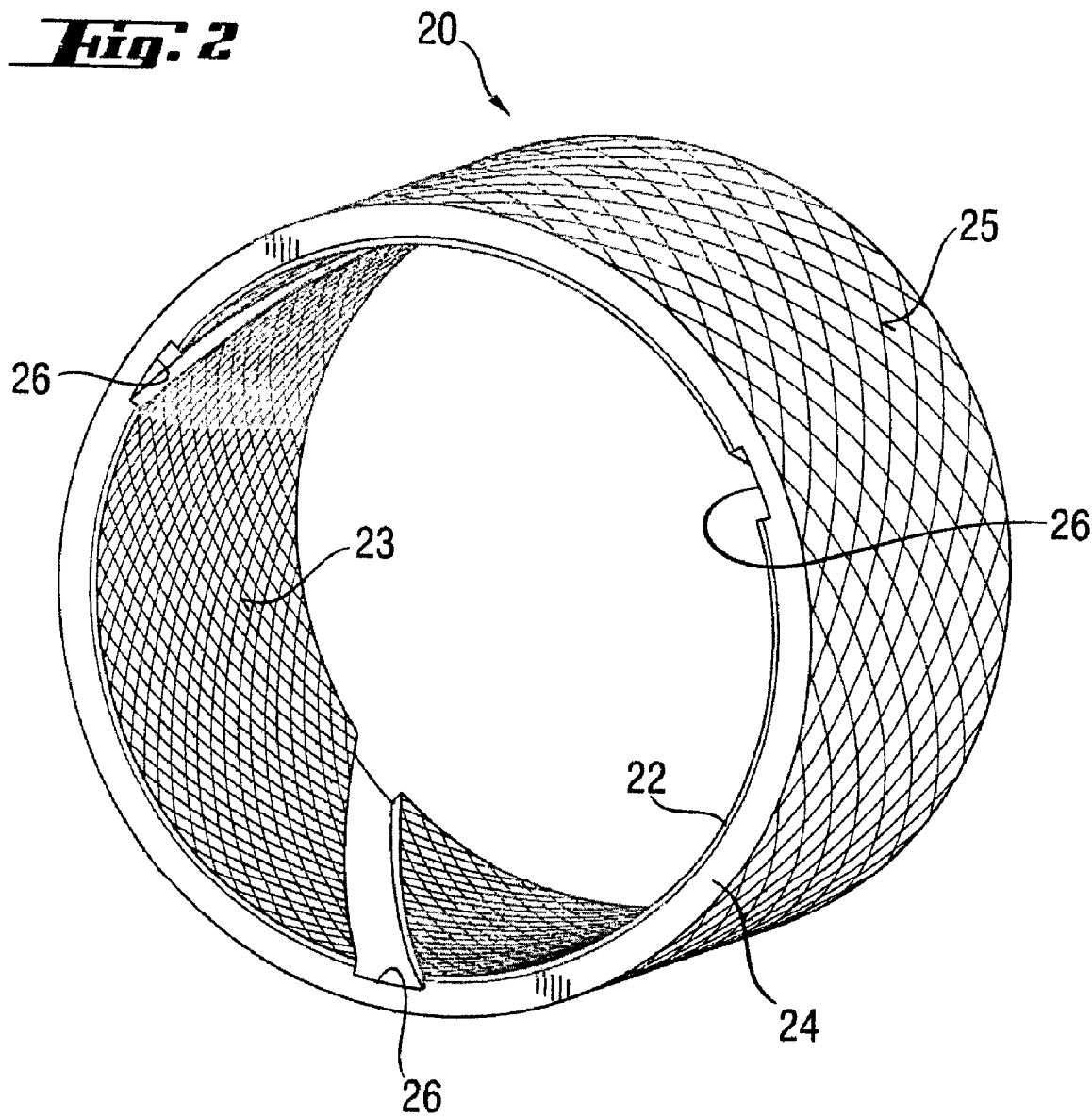
FIG. 2 shows a perspective representation of the sliding element according to the invention in the form of a radial sliding bearing.

An exemplary embodiment shows the sliding element, in this case a radial sliding bearing bush 20 according to FIG. 2. This bush has on its inside a sliding layer 22 and on its outside a support layer 24. Sliding layer 22 is designed radially thinner than support layer 24.

Both layers 22, 24 have been deposited in succession in the winding method on a winding mandrel to produce the winding structure 23 and 25 respectively represented by cross shading. It is also observed that the distance between the threads in winding structure 25 of support layer 24 is greater than in winding structure 23 of sliding layer 22. This indicates that the structures can be adapted individually to different requirements. For rationally symmetrical sliding elements the winding represents a particularly simple, low cost production method, and here the winding structures 23 and 25 of the reinforcing elements of sliding layer 22, as well as support layer 24, can be adapted easily to the mechanical requirements of the bearing. In addition to the simple cross structures represented, the threads can be wound not only singly but also into bundles, for example, thus enabling the reinforcing element of the support layer with a cross structure to be produced preferably grouped onto a winding mandrel of wound thread or fiber bundles.

On its side facing inwards the sliding layer has dirt grooves 26 which are worked into the sliding layer after the finished winding body is set and the bearing bush is separated by broaching, boring, turning or the like. This is possible because of the previously described properties of the thread used according to the invention as a reinforcing element without impairing the tribological properties of the sliding layer.

While different reinforcing elements, namely the plastic thread shown in FIG. 1 on the one hand, and glass fibers in support layer 24 on the other hand, are used in sliding layer 22 and support layer 24, the plastic matrix in both layers is preferably the same, namely epoxy resin. This is ideal because of its excellent adhesion and mechanical properties, and not least because of its comparatively low price. Alternatively, however, unsaturated polyester resins or vinyl ester resins may also be used.

In addition to the proven glass fibers, carbon fibers, for example, may also be considered as reinforcing elements for support layer 24. The thread may also be pre-processed initially into a fabric, knitted fabric or other textile.

In many applications solid lubricants, for example graphite particles or PTFE particles, are added to the plastic matrix of sliding layer 22. Support layer 24, on the other hand, generally has a plastic matrix without the addition of additional components.

In addition to the radial sliding bearing shown in FIG. 2, the sliding element according to the invention may also assume the form of a flanged bearing, a thrust washer, a loose bearing or fixed bearing, a bearing bush or a sliding plate. Different lamination methods may therefore be used for production. For example, reinforcing elements pre-impregnated in the so-called prepreg method may be joined together in the form of a fabric, knitted fabric or other textile in a subsequent pressing or autoclaving process to form the finished sliding elements, where prefabricated mats are inserted into a mould which is then filled with the synthetic resin under pressure. The preprocessed fabrics, knitted fabrics or other textiles may be further processed in the winding method.

FIGS. 3a, b show the behaviour of the coefficient of friction between a radial sliding bearing bush according to the invention and a steel shaft stored in it, which coefficient has been determined in a dry run test. In this case the shaft was turned back and fore with a roughness of $R_a$=0.4 to 0.8 by an angle of 45° and at a peripheral speed of 0.01 m/s. The specific load radially applied here was 25 MPa in the case of the upper measuring curve 25 (FIG. 3a). In the case of the lower measuring curve (FIG. 3b), a radial specific load of 50 MPa was applied under otherwise identical conditions.

The results show that a minimum coefficient of friction was achieved after a short run-in phase of approximately 2000 cycles, which in the case of the higher load throughout the test time of 60000 cycles was approximately constant at 0.05. In the case of the lower load the coefficient of friction rose after reaching the minimum, initially slowly, of approximately 0.06, after a period of approximately 15000 cycles, but showed a saturation of approximately 0.1. The slightly increased coefficient of friction in the case of the lower load is consistent with the rate of wear. This was 25 MPa at a value of 5.1 μm/km (sliding distance), while in the case of the higher load of 50 MPa it reached a value of 10.7 μm/km. Because of the generally increased wear under the higher load of 35 μm, compared to 17.5 μm under the lower load, more solid lubricant is released, which reduces the coefficient of friction. A significant smoothing of the pressurised sliding bearing surface was therefore also established, particularly in the case of the higher load.

Figure 4B:
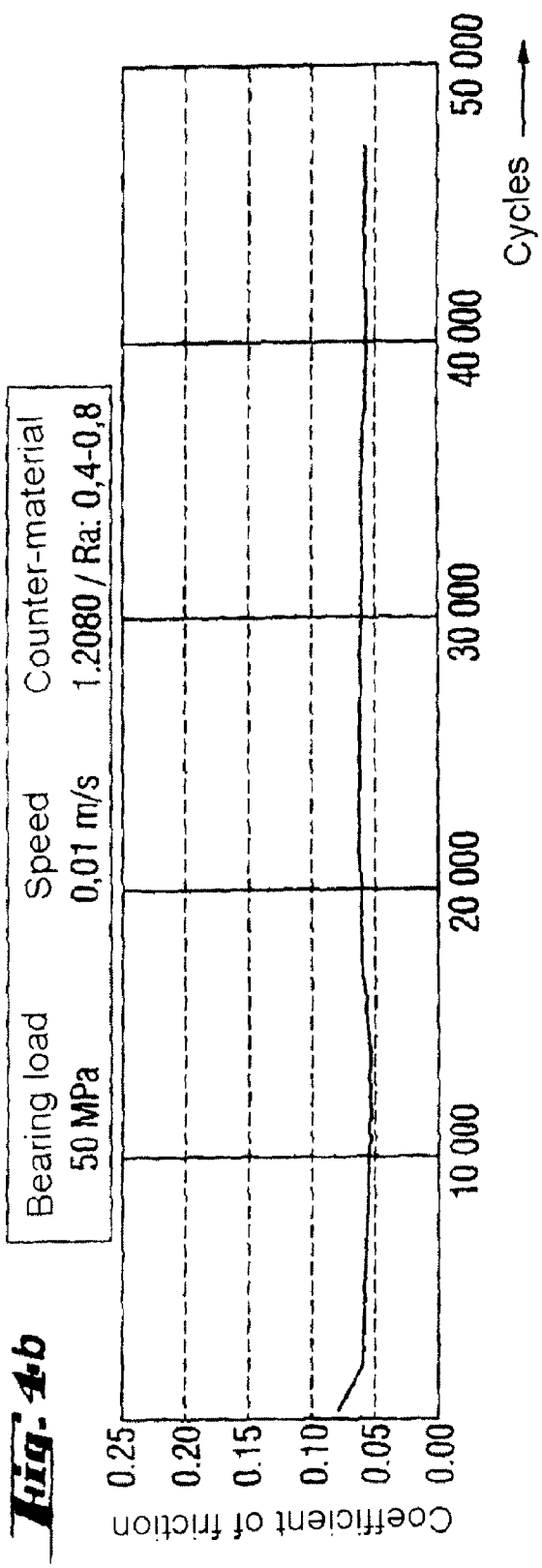

FIGS. 4a and 4b show the behaviour of the coefficients of friction of the shaft stored in a radial sliding bearing bush, under wet running conditions, i.e. in water. The test conditions were otherwise the same as above. Here too it is shown that the coefficient of friction is lower, in the case of the higher load of 50 MPa, lower graph in FIG. 4b, than in the case of the lower load of 25 MPa, upper graph, FIG. 4b. After a slightly extended run-in phase compared to dry running at 25 MPa, the coefficient of friction attained approximately the same value of 0.1. At 50 MPa a slightly higher mean value of 0.06, compared to dry running, was determined. Here too a lower rate of wear at 25 MPa of 8.1 μm/km and hence a lower wear of 21.25 μm, throughout the test time of approximately 47000 cycles, was observed compared to 27.2 μm/km and 70 μm respectively at 50 MPa. Again a significant smoothing of the pressurised sliding bearing surface was established, mainly in the case of the higher load.

In both load cases, however, no significant detachment of the sliding layer was observed. The wear values were far below those of the plastic sliding elements of prior art.

The invention claimed is:

1. A sliding layer comprising a fiber reinforced plastic with a plastic matrix and a plastic thread as a reinforcing element, wherein the plastic thread consists of polyester filaments and PTFE particles wherein the PTFE particles are spun into the polyester filaments and the PTFE particles do not adhere to one another and the PTFE particles are anchored to and arranged randomly between the polyester filaments.

2. The sliding layer according to claim 1, wherein the proportion of the PTFE particles in the plastic thread is between 2 and 40% by weight and the proportion of polyester filaments is between 60 and 98% by weight.

3. The sliding layer according to claim 2, wherein the proportion of PTFE particles in the plastic thread is between 30 and 36% by weight and the proportion of the polyester filaments is between 64 and 70% by weight.

4. The sliding layer according to claim 1, wherein the reinforcing element has the structure of a fabric or knitted fabric produced from the plastic thread.

5. The sliding layer according to claim 1, wherein the reinforcing element has a winding structure which has been produced by winding the plastic thread onto a winding core.

6. The sliding layer according to claim 1, wherein the plastic matrix consists of a synthetic resin.

7. The sliding layer according to claim 6, wherein the plastic matrix consists of epoxy resin.

8. The sliding layer according to claim 1, wherein the plastic matrix contains PTFE particles.

9. The sliding layer according to claim 8, wherein the proportion of the PTFE particles in the plastic matrix is a maximum of 40% by weight.

10. The sliding layer according to claim 1, wherein the plastic matrix contains graphite particles.

11. The sliding layer according to claim 10, wherein the proportion of the graphite particles in the plastic matrix is between 1 and 40% by weight.

12. A sliding element with a sliding layer according to claim 1.

13. The sliding element according to claim 12, including a support layer of a fiber reinforced plastic.

14. The sliding element according to claim 13, wherein the fiber reinforced plastic of the support layer has a plastic matrix and a glass fiber as reinforcing element.

15. The sliding element according to claim 14, wherein the reinforcing element of the support layer has the structure of a fabric or knitted fabric produced from the glass fiber.

16. The sliding element according to claim 14, wherein the reinforcing element of the support layer has a winding structure which has been produced by winding the glass fibers onto a winding core.

17. The sliding element according to claim 13, wherein the plastic matrix consists of a synthetic resin.

18. The sliding element according to claim 17, wherein the plastic matrix consists of epoxy resin.

\* \* \* \* \*